United States Patent [19]

Inoue et al.

[11] Patent Number: 5,027,150

[45] Date of Patent: Jun. 25, 1991

[54] CAMERA

[75] Inventors: Manabu Inoue; Hiroyuki Okada, both of Osaka, Japan

[73] Assignee: Minolta Camera Kabushiki Kaisha, Osaka, Japan

[21] Appl. No.: 539,366

[22] Filed: Jun. 15, 1990

Related U.S. Application Data

[63] Continuation of Ser. No. 349,825, May 10, 1989, abandoned.

[30] Foreign Application Priority Data

May 11, 1988 [JP] Japan .................................. 63-115114
May 11, 1988 [JP] Japan .................................. 63-115115

[51] Int. Cl.$^5$ .............................................. G03B 7/26
[52] U.S. Cl. ............................................................ 354/484
[58] Field of Search ............................................ 354/484

[56] References Cited

U.S. PATENT DOCUMENTS

| | | | |
|---|---|---|---|
| 4,469,990 | 9/1984 | Maruyama et al. | |
| 4,547,770 | 10/1985 | Suzuki et al. | |
| 4,645,326 | 2/1987 | Kiuchi et al. | 354/484 |
| 4,728,975 | 3/1988 | Ohara et al. | |
| 4,816,862 | 3/1989 | Taniguchi et al. | 354/484 |
| 4,857,946 | 8/1989 | Tominaga et al. | |

Primary Examiner—Russell E. Adams
Attorney, Agent, or Firm—Burns, Doane, Swecker & Mathis

[57] ABSTRACT

A camera comprising an electronic flash and other load devices powered by a source battery. The load devices are controllable by a microcomputer mounted in a camera body, which microcomputer is also powered by the source battery. The camera includes a power backup such as a capacitor for supplying power to the microcomputer when the source battery has run down. A detecting device detects an output voltage of the source battery, and outputs a detection signal when the output voltage is below a predetermined level. The microcomputer discontinues a camera sequence and operation of the load devices in response to the detection signal. While the camera sequence and operation of the load devices are suspended, photographic information is stored in the microcomputer powered by the backup. After lapse of a predetermined time period, the microcomputer enables the camera sequence and the operation of the load devices provided that the battery voltage is above the predetermined level.

39 Claims, 4 Drawing Sheets

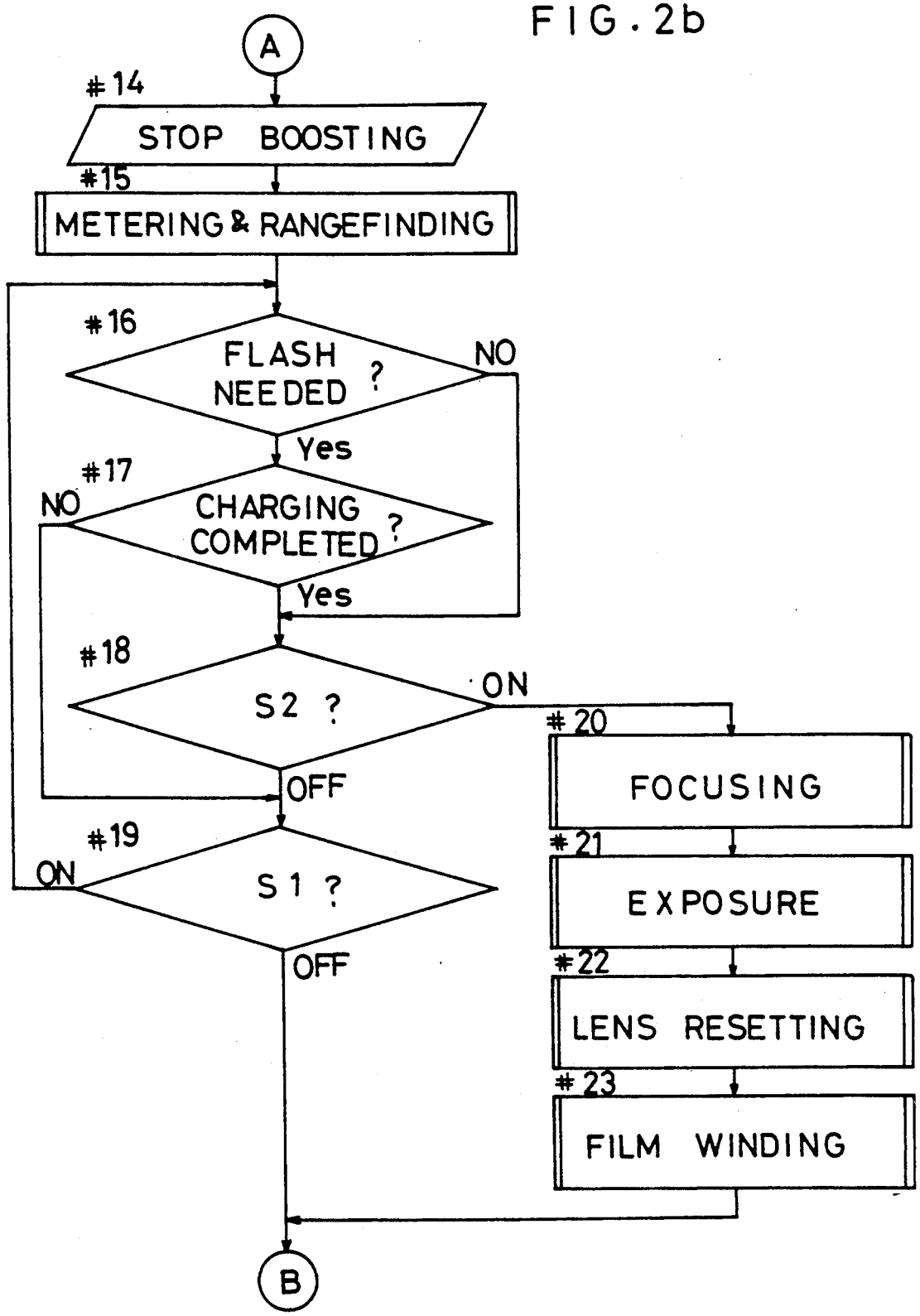

CAMERA

This application is a continuation of application Ser. No. 07/349,825, filed May 10, 1989 now abandoned.

BACKGROUND OF THE INVENTION

The present invention relates to a camera comprising various load devices such as an automatic exposure device, an automatic film advancing device and an electronic flash which are powered by a source battery mounted in the camera, and a control device such as a microcomputer also powered by the source battery for controlling the load devices. Such a camera further comprises a detecting device for detecting an output voltage of the source battery in relation to a predetermined voltage level, and a second control device for prohibiting or permitting the first-mentioned control device to transmit control signals to the various load devices in response to a detection signal received from the detecting device. With a capacity reduction of the battery, the voltage applied to the first control device such as a microcomputer falls below a minimum operating voltage thereof. As a result, the first control device may output abnormal control signals to cause malfunctions of the various devices. This camera prevents such malfunctions with the detecting device and the second control device.

In the camera noted above, once the detecting device outputs a low-voltage detection signal, the second control device holds the first control device against transmitting the control signals to the load devices. As a result, the load devices are maintained inoperable. Generally, an indication that the battery capacity has reduced is given to the user through a display device provided on the camera. The user will then learn that the battery has run down and should be replaced with a new one. Even if such a display device is not provided, the fact that the load devices do not operate will suggest a battery failure to the user as the most probable cause. Thus, the battery is changed once the output voltage thereof falls below the predetermined level.

Furthermore, various photographic information necessary for photo-taking, such as film sensitivity information and photographing modes, is often stored in a volatile memory included in the control device such as a microcomputer. Such information is not expected to remain in a valid form in the memory after the run-down source battery is removed from the camera body for change. When the photo-taking operation is resumed with a new source battery, the load devices of the camera do not function properly since their operations are based on muddled photographic information in the memory.

In order to avoid this inconvenience, it has conventionally been practiced to initialize the control device such as a microcomputer when a source battery is newly loaded into the camera body.

In the camera noted above, the source battery is changed with output of the control signals to the load devices suspended after the detecting device has given a low-voltage detection signal. This is done on the thought that the lowering below the predetermined level of the output voltage of the battery is caused by none other than a capacity reduction of the battery, and that a shortage in the voltage application to the first control device could result in output of abnormal control signals. This conventional practice has the following disadvantages.

The load devices of the camera vary in power consumption. Some, such as the display device and automatic exposure device, involve only minor current variations when in operation, and others, such as the electronic flash and automatic film advancing device, cause a large current flow at an initial stage of operation. There are occasions on which the electronic flash or the automatic film advancing device is operated with the battery capacity having reduced to a certain degree but not entirely exhausted. The output voltage of the battery may then fall below the predetermined level as a result of voltage reduction due to an internal resistance of the battery.

With the camera noted above, however, the first control device is prohibited from outputting the control signals in such a situation. It often is the case that the source battery is changed even if the battery has not run down to the extent to impair normal operations of the load devices and control device. This is a wasteful practice.

Moreover, since the control device is initialized when a new source battery is loaded, the various photographic information must be set all over again and restored in the memory for resuming the photo-taking. The information setting operation is troublesome and time-consuming.

SUMMARY OF THE INVENTION

Having regard to the state of the art noted above, it is an object of the present invention to provide a camera which economically uses a source battery and which enables a photo-taking operation to be resumed efficiently without necessitating restoration of various photographic information in the memory after the voltage application to the control device returns to a predetermined level.

The above object is fulfilled, according to the present invention, by a camera comprising power supply means; detecting means for detecting a voltage of the power supply means and outputting a detection signal when the voltage of the power supply means is below a predetermined level; timer means for counting a predetermined time period in response to the detection signal; and control means powered by the power supply means for controlling a camera sequence and load means in the camera, such that the control means discontinues the camera sequence and operation of the load means in response to the detection signal and, after lapse of the predetermined time period, enables the camera sequence and the operation of the load means based on a result of detection by the detecting means.

The electronic flash, automatic film advancing device or other such load device consumes a large amount of power only for a very short period at an initial stage of operation, with the result that the voltage applied to the control device falls below a minimum operating voltage thereof. After that short period, the situation will return to normal. The present invention is based on this notion.

According to the present invention, when the output voltage of the power supply means or source battery falls below a predetermined level, the control means is first prohibited from outputting abnormal control signals to avoid malfunctions of the load devices. Upon lapse of a predetermined time period therefrom, the output voltage of the battery is checked against the predetermined level again. If the output voltage is above the predetermined level at this time, it is judged that the voltage drop was caused by a large power consumption of the temporary nature and that the battery is capable of maintaining the normal operation of the control device thereafter. Then the control device is allowed to output the control signals. If the output voltage remains below the predetermined level, it is judged that the voltage drop is due to exhaustion of the source battery, which will not guarantee a subsequent normal operation of the control device. As a result, the control signal outputs remain suspended.

In a preferred embodiment of the present invention, the power supply means includes a backup device for supplying power to the control device when the source battery is removed from the camera body. This backup device may comprise a capacitor charged by the source battery while the latter is mounted in the camera body, or may comprise an additional battery. The backup device applies to the control device a voltage equal to or exceeding the minimum operating voltage thereof when the source voltage falls below the predetermined level, prohibiting the control device from outputting the control signals. Consequently, various photographic information is retained in a proper state in a memory included in the control device.

When a new source battery is loaded into the camera with the control device prohibited from outputting the control signals, the detecting means may detect the voltage output of the new battery. The detecting means may also find the voltage applied to the control device higher than the necessary level. It is then judged that the control device will operate in a normal way, whereupon the camera sequence is resumed based on the photographic information retained in a proper state in the memory. On the other hand, even if a new source battery is loaded into the camera, the voltage applied to the control device may be insufficient. Although the voltage applied to the control device is sufficient, a new battery may not be present in the camera body. In this case, the output of the control signals continues to be suspended.

That is, when an exhausted source battery is newly loaded into the camera body, the control device cannot be expected to operate in a normal way with an insufficient voltage application thereto. Where, for example, the backup device supplies power to the load devices as well as the control device, a sufficient voltage may be applied to the control device. However, since the backup device is intended for temporarily supplying power as a substitute for the source battery, power consumption by the load devices will result in early exhaustion of the backup device. The photographic information, therefore, cannot be stored in the memory over a long time. For this reason, the output of control signals from the control device is suspended until a new valid battery is loaded into the camera body.

As described above, a camera according to the present invention is adapted to prohibit the control device from outputting control signals to the load devices to avoid malfunctions of the latter when the output voltage of the source battery falls below a predetermined level. The source battery is changed only when its output voltage drop is due to exhaustion thereof to such an extent that the control device cannot be expected to function properly in a normal use. When the output voltage drop is caused by a temporary power consumption, the camera sequence is resumed thereby avoiding an unduly early battery change. Moreover, when the output voltage of the source battery falls below the predetermined level even for an instant as a result of the temporary power consumption, the output of control signals from the control device is prohibited once. This provides an assurance against malfunctions of the load devices.

As a further feature of the invention, the backup device supplies power to the control device in the absence of the voltage output of the source battery. Consequently, various photographic information may be retained in a proper state in the memory included in the control device when the capacity of the source battery has reduced to such an extent that the control device cannot be expected to function normally or when the battery is removed from the camera body for change. The photographic information is protected from disturbance while, as a result of an insufficient voltage application to the control device, the control device is prohibited from outputting control signals to avoid malfunctions of the load devices. When a normally operable state is reinstated, the camera sequence may be resumed by utilizing the photographic information stored in the memory without initializing the control device. Thus, the present invention dispenses with the troublesome and time-consuming operation for setting various photographic information such as a photographic mode, film sensitivity and the like all over again which was a necessary step following a battery change in the prior art.

With detection of the presence of a source battery having a sufficient capacity, the operations of the load devices are resumed by enabling the control device to output the control signals. This positively prevents malfunctions due to use of a source battery lacking in capacity. On the other hand, the backup device allows the photographic information to be stored in the memory over a long time without permitting wasteful power consumption. Therefore, although a little time may be consumed in changing the source battery, the interrupted camera operation may be resumed without the trouble of setting various photographic information all over again.

Thus, the present invention provides a camera which is fully reliable and economical in using the source battery, and which has excellent operability when a battery change takes place.

The foregoing and other objects, features and advantages of the invention will be apparent from the following more particular description of a preferred embodiment of the invention, as illustrated in the accompanying drawings.

BRIEF DESCRIPTION OF THE DRAWING

FIGS. 2a and 2b are flow charts showing the operation of a microcomputer included in the control circuit for controlling the camera.

DETAILED DESCRIPTION OF THE PREFERRED EMBODIMENT

An embodiment of the present invention will be described hereinafter with reference to the drawings.

Figure 1:
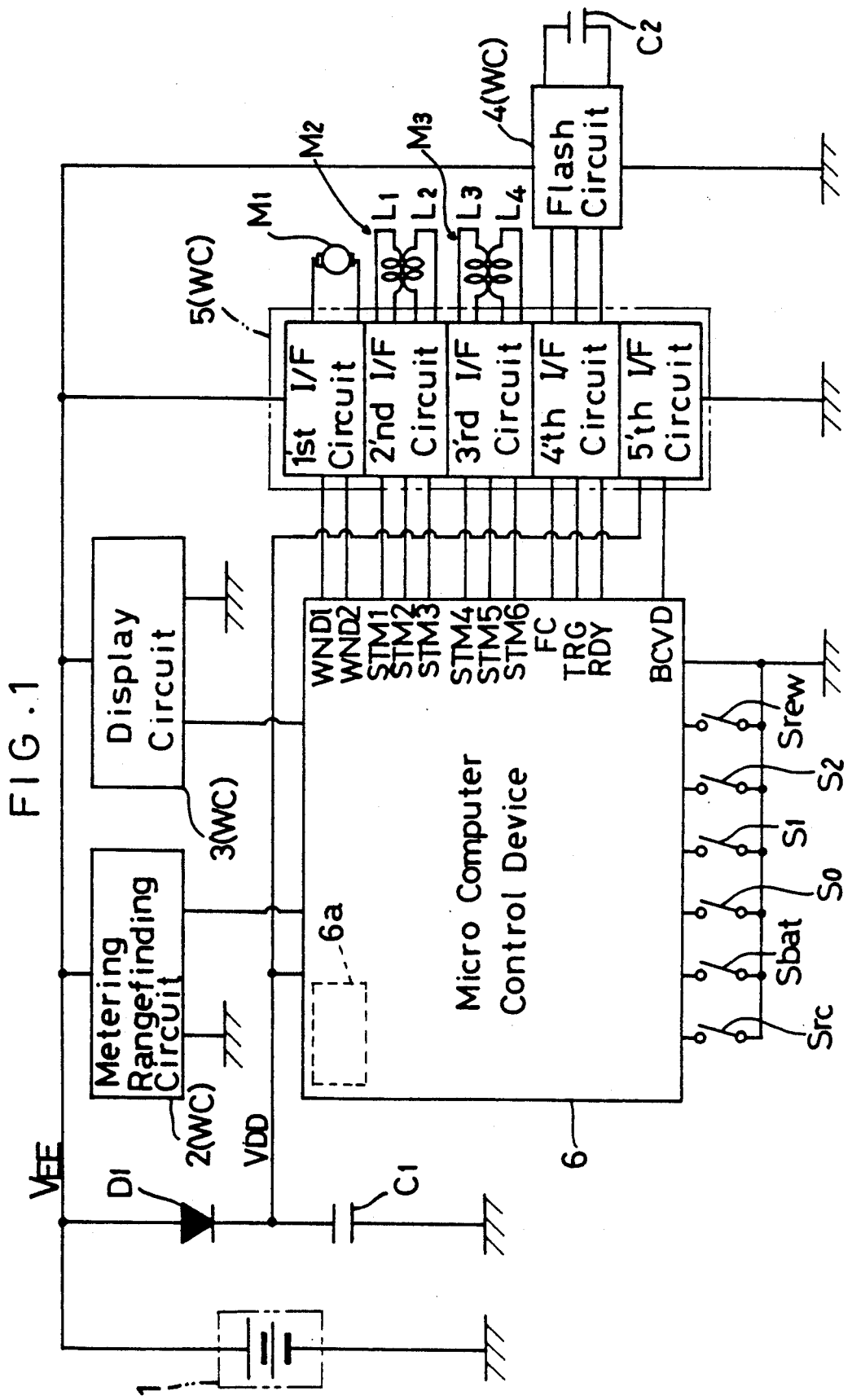
FIG. 1 is a block diagram of a control circuitry in a camera according to the present invention.

FIG. 1 schematically shows an overall circuitry of a camera embodying the present invention. Reference numeral 1 denotes a source battery removably mounted in a camera body not shown. The battery 1 supplies power through a source line VEE to working components WC including a metering and rangefinding circuit 2, a display circuit 3, a flash circuit 4 and five interface circuits 5A-5E. A series circuit of a diode D1 and a capacitor C1 is connected to the source line VEE in parallel to the battery 1. A source line VDD is connected to a position of the series circuit between the diode D1 and capacitor C1 for supplying power to a microcomputer 6 acting as a control device and to the fifth interface circuit 5E.

The capacitor C1 is charged by the power supply from the source battery 1 mounted in the camer body. When the capacity of the battery 1 has lowered below a predetermined level or when the battery 1 is removed from the camera body, the capacitor C1 supplies power to the microcomputer 6 and the fifth interface circuit 5E. At this time, the microcomputer 6 and the fifth interface circuit 5E are applied with a voltage not below a minimum voltage assuring their operation. The diode D1 stops current flowing to the source line VEE.

The microcomputer 6 is connected to a plurality of switches Src, Sbat, S0, S1, S2 and Screw disposed at various positions of the camera. Each of the switches Src, Sbat, S0, S1, S2 and Srew is grounded at one end thereof, and pulled up at the other end inside the microcomputer 6 to the source line VDD.

The switch Src is a back cover switch operable with opening and closing of a back cover (not shown) of the camera body. The switch Src is closed when the back cover is opened, and is opened when the back cover is closed. The switch Sbat is a battery switch operable with loading and unloading of the source battery 1 into and out of the camera body, for detecting battery states. The switch Sbat is closed when the battery 1 is mounted in the camera body, and is opened when the battery 1 is removed therefrom. The switch S0 is a lens barrier switch operable with opening and closing of a lens barrier (not shown) provided in the camera body. The switch S0 is closed when the lens barrier is opened, and is opened when the lens barrier is closed. The microcomputer 6 prohibits a phot-taking operation when the switch S0 is opened, i.e. when the lens barrier is closed. The switch S1 is a metering switch which is closed when a shutter release button (not shown) provided on the camera body is pressed to a first step. With the closure of this switch S1, the microcomputer 6 outputs a control signal to the metering and rangefinding circuit 2 for carrying out metering and rangefinding operations. The switch S2 is a release switch which is closed when the shutter release button is pressed to a second step following the first-step depression. With the closure of this switch S1, the microcomputer 6 enters into a release sequence for carrying out a photo-taking operation. The switch Srew is a normally opened rewind switch for manually and forcibly rewinding a film. The film is rewound with closure of the switch Srew. Once the switch Srew is closed, this informaiton is stored inside the microcomputer 6 for continuing a rewinding operation even after the switch Srew is opened.

The metering and rangefinding circuit 2 measures luminance of a photographic subject and a distance to the subject upon receipt of the control signal form the microcomputer 6.

The display circuit 3 is operable in response to a control signal from the microcomputer 6 for displaying various photographic information such as a photographic mode, film information and exposure information on a liquid crystal display (not shown) provided on the camera body.

The interface circuit 5A receives control signals from a pair of output terminals WND1 and WND2 of the microcomputer 6, and controls a film advancing motor M1 for automatic film winding or rewinding depending on a combination of the signals.

The second and third interface circuits 5B and 5C each receive control signals from three output terminals STM1-STM3 or STM4-STM6 for controlling a lens advancing and retracting stepper motor M2 or a shutter opening and closing stepper motor M3. Both stepper motors M2 and M3 are driven by the two-phase excitation bipolar drive method. The lens advancing and retracting stepper motor M2 is rotatable forward for advancing a photographic lens (not shown) and backward for retracting the photographic lens. The shutter opening and closing stepper motor M3 is rotatable forward for opening a shutter (not shown) and backward for closing the shutter. The control signals output from the output terminals STM1 and STM2 determine the direction of current flow through a pair of coils L1 and L2 of the lens advancing and retracting stepper motor M2. The control signal output from the output terminal STM3 effects an ON/OFF control of the current flow through the coils L1 and L2. The control signals output from the output terminals STM4 and STM5 determine the direction of current flow through a pair of coils L3 and L4 of the shutter opening and closing stepper motor M3. The control signal output from the output terminal STM6 effects an On/OFF control of the current flow through the coils L3 and L4.

The fourth interface circuit 5D receives control signals from an output terminal FC of the microcomputer 6, and controls start and finish of boosting by the flash circuit 4. Further, the fourth interface circuit 5D receives a control signal from an output terminal TRG, and controls triggering of a flash unit (not shown) attached to the camera body.

A capacitor C2 is connected to the flash circuit 4 for supplying power for emitting a flash light. The flash circuit 4 output information on charging of the capacitor C2 to the fifth interface cicuit 5D. In response to this charging information, the fourth interface circuit 5D transmits a control ready signal to an input terminal RDY of the microcomputer 6.

The control signal transmitted to the input terminal RDY is in high level when the capacitor C2 is not charged sufficiently, and changes to low level when the capacitor C2 is charged to 300 V. The fourth interface circuit 5D has a hysteresis so that, after the control signal to the input terminal RDY changes to low level once, the control signal changes to high level when the charge voltage of the capacitor C2 falls to 260 V or below.

The fifth interface circuit 5E is connected to the source line VDD leading to the microcomputer 6 as noted hereinbefore. The fifth interface circuit 5E transmits a signal indicating a voltage level of the source line VDD to an interrupt input terminal BCVD of the microcomputer 6. The voltage level signal is in low level when the voltage level V of the source line VDD is equal to or above a reference voltage V0 derived by adding the minimum operating voltage of the microcomputer 6 and a voltage reduction expected to take place with operation of the microcomputer 6 while the battery 1 is removed. The voltage level signal changes to high level when the voltage level of the source line VDD falls below the reference voltage VO.

The program is interrupted for the microcomputer 6 to execute an interrupt processing when the voltage level signal input to the input terminal BCVD changes from low level to high level.

In the interrupt processing, as described later, all the control signal outputs to the working components WC are stopped for interrupting their operations. Upon lapse of a predetermined time period therefrom, the voltage level signal is checked and, if the signal has returned to low level, the control signal outputs are resumed for carrying out the interrupted operations.

When the capacity of the battery 1 falls below the predetermined level, the voltage level V of the source line VDD leading to the microcomputer 6 also falls below the reference voltage VO. Apart from this, even if the capacity of the battery 1 has not fallen to the extent that impairs normal operations, a voltage reduction occurs owing to an internal resistance of the battery 1 with a large amount of current immediately following start of boosting by the flash circuit 4 or start of rotation of each motor M1, M2 or M3. As a result, the voltage level V of the source line VDD leading to the microcomputer 6 may temporarily fall below the reference voltage VO. The battery 1 may still be used unless such a large amount of current is required, and change of the battery 1 at this stage is uneconomical. For this reason, the voltage V applied to the microcomputer 6 is checked again upon lapse of the predetermined period to judge whether the voltage drop is of the temporary nature or not. The various operations are resumed if the checking shows that the voltage V has returned to the reference voltage VO or above. In the event that the voltage V remains below the reference voltage VO, the control signal outputs are suspended and an indication is given that a battery change is necessary. In this way the source battery may be used most economically. In addition, the control signal outputs from the microcomputer 6 are stopped once when the voltage V applied to the microcomputer 6 falls below the reference voltage VO temporarily as it may be and even if the battery 1 may still be used. This provides an assurance against malfunctioning of the working components WC and secures reliability.

When the second checking of the voltage V applied to microcomputer 6 shows that the battery 1 should be changed, the microcomputer 6 withholds output of the control signals to the working components WC, and at the same time stores various photographic information in a memory 6a forming part of the microcomputer 6. Such photographic information includes operating states, a photographic mode, exposure data, film data and the like that have been valid till the second checking. After a new source battery 1 is loaded into the camera body as replacement for the old battery 1, and the voltage V applied to microcomputer 6 is found equal to or above the reference voltage VO, the photographic information stored in the memory 6a is used for resuming the photo-taking operation in the same condition as before the battery change. As distinct from the case where the microcomputer is initialized with loading of a new battery, the invention does not require the troublesome step of setting various photographic information all over again. This, the photo-taking operation is smoothly resumed according to the present invention.

The photographic information is retained in the memory 6a during the battery change, which is enabled by a power supply to the microcomputer 6 at least with the minimum operating voltage. This power supply is made by backup means comprising the capacitor C1 and diode D1.

The camera operations according to the present invention will be described further with reference to the flow charts shown in FIGS. 2A, 2B and 3.

Figure 2A:
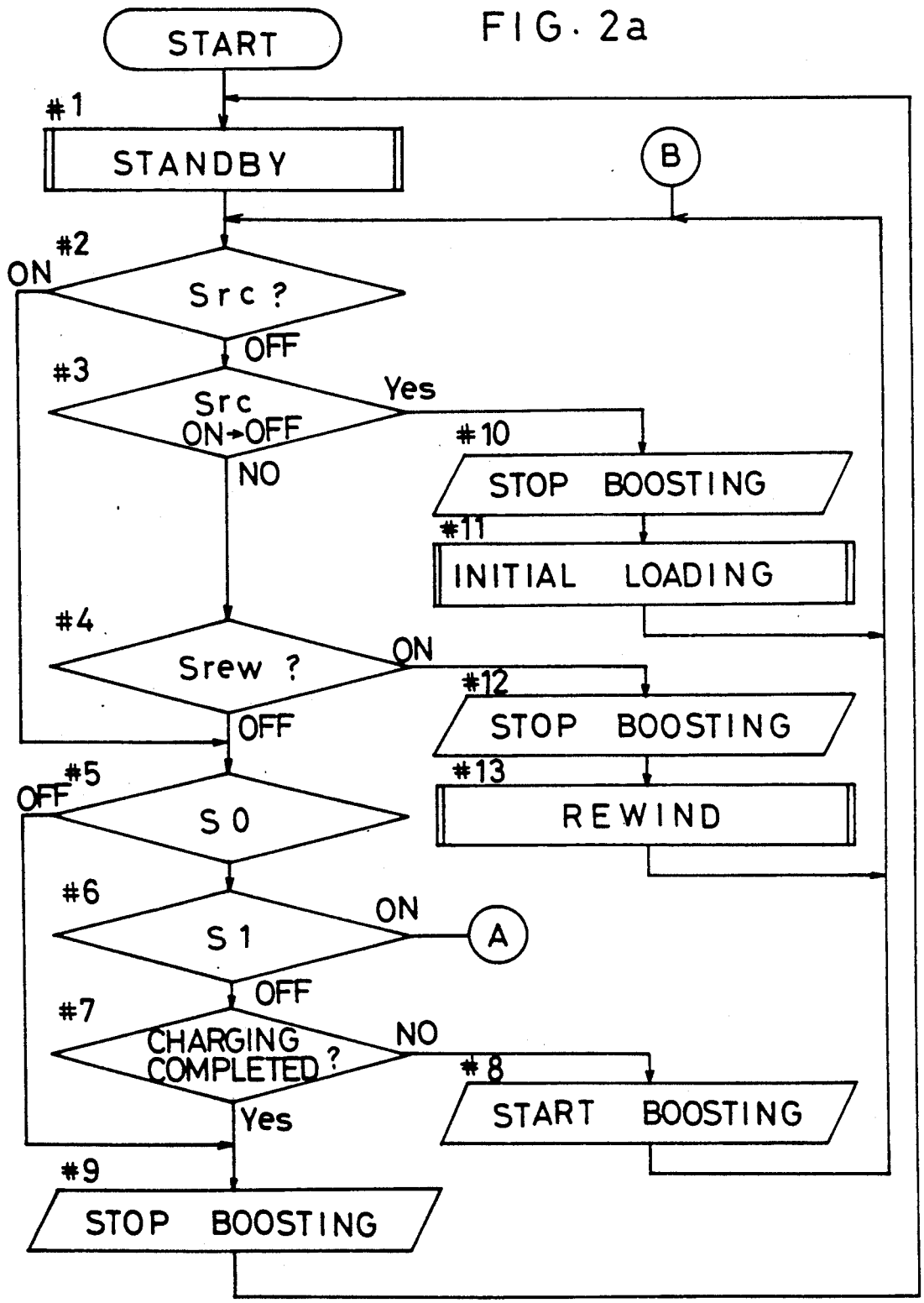

FIGS. 2A and 2B show flow charts illustrating camera operations at a normal time. When the camera is not manipulated by the user, the microcomputer 6 stands by at step #1 waiting for a change in the input from one of the switches.

The program moves to step #2 when a change occurs resulting from operation of one of the back cover switch Src, rewind switch Srew, lens barrier switch SO and metering switch S1. At step #2, the state of back cover switch Src is checked.

If the back cover switch Src is closed indicating that the back cover is opened, the program jumps to step #5. If the back cover switch Src is open indicating that the back cover is closed, the program moves to step #3 for checking whether the back cover switch Src has been open for a certain period or was opened from the closed state just now.

The program moves to step #10 if the back cover switch Src was opened from the closed state, that is if the opened back cover was closed. At step #10, a control signal is output from the output terminal FC for stopping a boosting operation. This stops a boosting operation of the flash circuit 4 if in progress. Subsequently, an initial loading subroutine is called at step #11 for advancing the film by way of preparation for photo-taking. After finishing this subroutine, the program returns to step #2 for repeating the foregoing sequence.

If step #3 finds the back cover switch Src to have been open since before, namely the back cover has been closed, the program moves to step #4 for checking the state of rewind switch Srew.

If the rewind switch Srew is closed, the boost stopping control signal is output from the output terminal FC at step #12. Subsequently, a film rewind subroutine is called at step #13 for rewinding the film. After finishing this subroutine, the program returns to step #2 for repeating the foregoing sequence. If the rewind switch Srew is open, the program moves to step #5.

At step #5, the state of lens barrier switch SO is checked. If the lens barrier switch SO is open, that is if the lens barrier is closed, the program moves to step #9 for outputting the boost stopping signal from the output terminal FC. Then the program returns to step #1 to wait for a change in the switch inputs. If step #5 finds the lens barrier switch SO closed, that is if the lens barrier is open, the program moves to step #6 for checking the state of metering switch S1.

If the metering switch S1 is open, that is if the shutter release button is not pressed, the program moves to step #7 for checking the control signal input to the input terminal RDY. This checking is made to find out whether or not the capacitor C2 connected to the flash circuit 4 is charged to a sufficient voltage level for emitting a flash light. More particularly, it is checked whether the charge has reached 300 V at the initial charging time and whether the charge remains above 260 V after once reaching 300 V.

If the charge voltage is found sufficient for light emitting, the program moves to step #9 for outputting the boost stopping signal from the output terminal FC.

Then the program returns to step #1 to wait for a change in the switch inputs. If the charge voltage is found insufficient for light emitting, the program moves to step #8 for outputting a boost starting signal from the output terminal FC. Subsequently, the program returns to step #2 for repeating the foregoing sequence.

If step #6 finds the metering switch S1 closed, that is if the shutter release button is pressed to the first step, the boost stopping signal is output from the output terminal FC at step #14. Then, a metering and rangefinding subroutine is called at step #15 for actuating the metering and rangefinding circuit 2 to carry out metering and rangefinding operations. Subsequently, step #16 is executed for judging from subject luminance information and the like resulting from the metering and rangefinding operations whether flashlight is needed for photo-taking.

If flashlight is judged unnecessary, the program moves to step #18. Otherwise, the program moves to step #17 for judging from the control signal input to the input terminal RDY whether the charge voltage is sufficient for light emitting or not. If the charge voltage is sufficient, the program moves to step #19. If not, the program moves to step #18.

At step #18, the state of shutter release switch S2 is checked. If the shutter release switch S2 is open, that is if the release button is not pressed to the second step, the program moves to step #19. At step #19, the state of metering switch S1 is checked again. If the metering switch S1 is closed, the program returns to step #16. If the metering switch S1 is open, that is if the shutter release button is not pressed, the program returns to step #2 for repeating the foregoing sequence.

If step #18 finds the release switch S2 closed, that is if the shutter release button is pressed to the second step, a focusing subroutine is called at step #20. In this subroutine, the photographic lens is advanced to an in-focus position from an initial, innermost position on the basis of results of the rangefinding operation carried out at step #15. Next, an exposure subroutine is called at step #21 for controlling the shutter and flash based on the results of the metering operation carried out at step #15. Then a lens resetting subroutine is called at step #22 for retracting the photographic lens to the initial position. Finally, a film winding subroutine is called at step #23 for advancing the film by one frame, which is followed by a return to step #2 for repeating the foregoing sequence.

Figure 3:
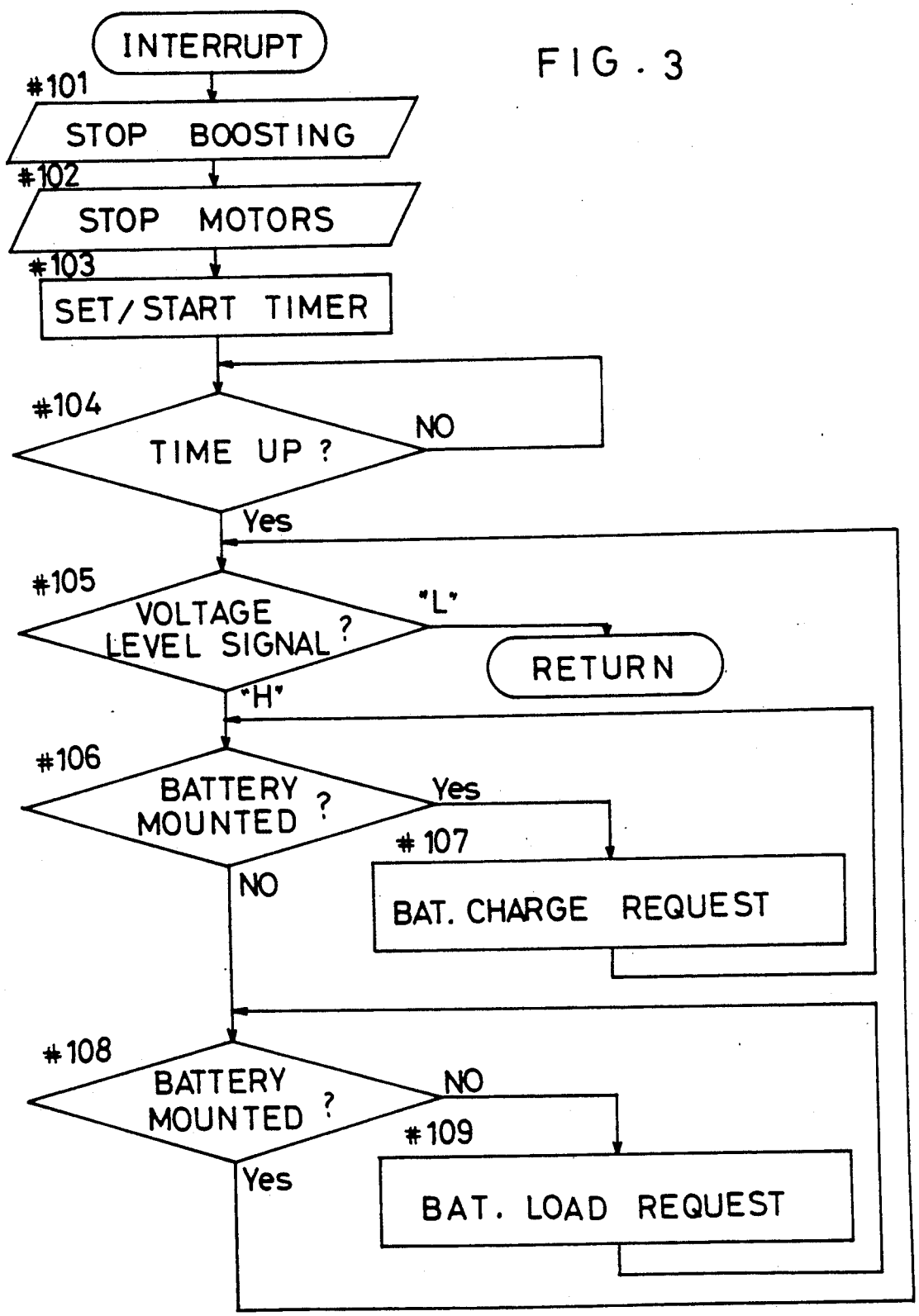
FIG. 3 is a flow chart showing an interrupt routine.

FIG. 3 is a flow chart of the interrupt processing routine executed when an interrupt input is made from the fifth interface circuit 5E to the interrupt input terminal BCVD of the microcomputer 6.

In this routine, the boost stopping signal is first output from the output terminal FC at step #101. Then, at step #102, motor stopping control signals are output from the output terminals WND1, WND2, STM3 and STM6 to the motors M1-M3. The control signal outputs from the microcomputer 6 to the flash circuit 4 and to the motors M1-M3 are prohibited, thereby interrupting any operations in progress. Since current consumption begins to diminish with a load reduction resulting therefrom, the output voltage of the source battery 1 begins to recover.

Subsequently, an internal timer is set to a time period and started at step #103. This time period is, for example, one second which is required for the output voltage of the battery 1 to recover to such a degree that the battery 1 may be used without involving a large current consumption.

The program stands by at step #104 until the time period expires. Upon expiration thereof, the voltage level signal input to the interrupt input terminal BCVD is checked at step #105.

The voltage level signal being in low level means that the voltage V applied to the microcomputer 6 is equal to or above the reference voltage VO and the battery 1 may still be used. Then the program returns to the step at which the interrupt occurred, for resuming the interrupted operation.

If the voltage level signal is in high level, this means that the voltage V applied to the microcomputer 6 reamins below the reference voltage VO. It is thus judged that the capacity of the battery 1 has lowered to a level from which the battery 1 is irrecoverable for use despite the one-second load reduction. In this case, the program executes steps #106 et seq. for changing the battery.

At step #106, checking is made from the input from the battery switch Sbat whether the battery 1 is mounted in the camera body or not. If the battery 1 is mounted, its capacity is now insufficient for use and a battery change request signal is outputted at step #107 for prompting the user through the display to change the battery. Then the program returns to step #106 for a standby until the battery 1 is removed from the camera body.

If step #106 finds no battery, this indicates that the user has removed the battery 1 from the camera body for change in accordance with the battery change request. Then, step #108 is executed for checking, again, from the input from the battery switch Sbat whether a new battery 1 has been mounted in the camera body or not. If the result is "no battery", this indicates that a new battery is not mounted yet. Then, step #109 is executed for outputting a battery loading request signal to prompt the user through the display to load a battery into the camera body. Subsequently, the program returns to step #108 for a standby until a new battery is loaded into the camera body.

If step #108 finds a new battery mounted in the camera body, the program returns to step #105 for checking the voltage level signal input to the interrupt input terminal BCVD to find out whether the battery 1 has a sufficient capacity for use or not. If the voltage level signal is in low level, that is if the voltage V applied to the microcomputer 6 is equal to or above the reference voltage VO, the program returns to the step at which the interrupt occurred, for resuming the interrupted operation. If the voltage level signal is in high level, the battery 1 is not usable. Then steps #106 et seq. are executed for the user to change the battery again.

Other embodiments of the present invention will be described next.

(1) Various other components are conceivable in addition to the working components WC included in the foregoing embodiment. For example, a drive device for effecting auto-zooming may be included in the case of a camera having a zoom lens. A drive device for turning a magnetic disk may be included in the case of an electronic still camera. The number of working components WC is variable, and the components noted above may be provided in various combinations.

(2) In the foregoing embodiment, the source battery 1 is removably mounted in the camera body. The battery 1 may comprise a disposable primary battery, or may be a secondary battery which is rechargeable outside the camera body for repeated use. Further, the battery 1 may comprise a secondary battery fixed to the camera body and rechargeable by connecting the camera body to an electric outlet or a charger either directly or by means of a cord or the like.

(3) In the foregoing embodiment, the series circuit of capacitor C1 and diode D1 is connected in parallel to the source battery 1 as the backup means for supplying power to the microcomputer 6 acting as the control device when the battery 1 has run down. Alternatively, the backup means may comprise a primary backup battery or the like. In this case, the backup battery may be connected in parallel to the source battery 1, with a diode provided for stopping backflow. The backflow battery may be provided completely independently of the source battery 1 instead.

(4) In the foregoing embodiment, the backup means comprises the capacitor C1 and diode D1 connected in series to each other and parallel to the source battery 1. Therefore, the voltage V applied to the microcomputer 6 is compared with the predetermined reference voltage VO by the fifth interface circuit 5E acting as detecting means. The predetermined voltage VO is the sum of the minimum operating voltage of the microcomputer 6 and the voltage reduction expected to take place with the operation of the microcomputer 6 during a battery change. This reference voltage VO may be varied as desired. For example, the reference voltage VO may be equal to the minimum operating voltage of the microcomputer 6 where, as noted in paragraph (3) above, a backup battery is provided. independently of the source battery 1 and is capable of continuously applying the microcomputer 6 with a voltage equal to or exceeding the minimum operating voltage thereof while the source battery 1 is being changed.

(5) The foregoing embodiment detects availability of the voltage of the source battery 1 through the battery switch Sbat. This battery voltage detecting means is employed assuming that the battery 1 mounted in the camera body has a voltage. Alternatively, the voltage of the source battery 1 may be detected directly. In this case, the predetermined referece voltage may be a sum of the reference voltage VO in the foregoing embodiment and a voltage reduction due to the diode D1. This predetermined voltage may be varied for the reason noted in paragraph (4) above.

(6) In the foregoing embodiment, the voltage V applied to the control device 6 is checked, for example, one second from the start of the signal output prohibition. This one-second period may be varied as appropriate, taking the capacity of the battery 1 and the makeup of working components WC into account.

(7) The present invention is applicable to a camera using a photo-sensitive as the recording medium, an electronic still camera using a magnetic disk, and a video camera using a magnetic tape. The specific construction of the camera itself is variable. The still camera, for example, may comprise any kind, such as a single lens reflex camera or a rangefinder camera or the like.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A camera comprising:
   power supply means;
   detecting means for detecting a voltage of said power supply means and outputting a detection signal when the voltage of said power supply means is below a predetermined level;
   timer means for counting a predetermined time period in response to said detection signal; and
   control means powered by said power supply means for controlling a camera sequence and load means in the camera, such that said control means discontinues the camera sequence and operation of said load means in response to said detection signal and, after lapse of said predetermined time period, enables the camera sequency and the operation of said load means in the event that said detecting means detects that the voltage of said power supply means is equal to or above the predetermined level.

2. A camera as claimed in claim 1, wherein said power supply means includes a battery, and backup means connected to said battery, said load means also being connected to said battery.

3. A camera as claimed in claim 1, wherein said control means is operable to maintain said camera sequence and said load means in an inoperative state when the voltage of said power supply means remains below the predetermined level after lapse of said predetermined time period.

4. A camera as claimed in claim 2, wherein said battery is disposable battery removably mounted in a camera body.

5. A camera as claimed in claim 2, wherein said battery is rechargeable battery removably mounted in or fixed to a camera body.

6. A camera as claimed in claim 2, wherein said backup means comprises a capacitor.

7. A camera as claimed in claim 2, wherein said backup means comprises a battery.

8. A camera as claimed in claim 1, 2 or 3, wherein said load means includes a motor for winding a film.

9. A camera as claimed in claim 1, 2 or 3, wherein said load means includes a electronic flash.

10. A camera as claimed in claim 1, 2 or 3, wherein said load means includes drive means for driving a zoom lens.

11. A camera as claimed in claim 1, 2 or 3, wherein a silver chloride film is used as a recording medium.

12. A camera as claimed in claim 1, 2 or 3, which is an electronic still camera using a magnetic disk as a recording medium.

13. A camera as claimed in claim 1, 2 or 3, which is a video camera using a magnetic tape as a recording medium.

14. A camera comprising:
    power supply means;
    detecting means for detecting a voltage of said power supply means and outputting a detection signal when the voltage of said power supply means is below a predetermined level;
    a microcomputer powered by said power supply means and including timer means for counting a predetermined time period in response to said detection signal, and control means for controlling a camera sequence and load means in the camera, such that said control means discontinues the camera sequence and operation of said load means in response to said detection signal and, after lapse of said predetermined time period, enables the camera sequence and the operation of said load means in the event that said detecting means detects that the voltage of said power supply means is equal to or above the predetermined level.

15. A camera as claimed in claim 14, wherein said power supply means includes a battery, and backup means connected to said battery, said load means also being connected to said battery.

16. A camera as claimed in claim 14, wherein said microcomputer is operable to maintain said camera sequence and said load means in an inoperative state when the voltage of said power supply means remains below the predetermined level after lapse of said predetermined time period.

17. A camera as claimed in claim 15, wherein said battery is a disposable battery removably mounted in a camera body.

18. A camera as claimed in claim 15, wherein said battery is a rechargeable battery removably mounted in or fixed to a camera body.

19. A camera as claimed in claim 15, wherein said backup means comprises a capacitor.

20. A camera as claimed in claim 15, wherein said backup means comprises a battery.

21. A camera as claimed in claim 14, 15 or 16, wherein said load means includes a motor for winding a film.

22. A camera as claimed in claim 14, 15 or 16, wherein said load means includes an electronic flash.

23. A camera as claimed in claim 14, 15 or 16, wherein said load means includes drive means for driving a zoom lens.

24. A camera as claimed in claim 14, 15 or 16, wherein a silver chloride film is used as a recording medium.

25. A camera as claimed in claim 14, 15 or 16, which is an electronic still camera using a magnetic disk as a recording medium.

26. A camera as claimed in claim 14, 15 or 16, which is a video camera using a magnetic tape as a recording medium.

27. A camera comprising:
power supply means;
first detecting means for detecting a voltage of said power supply means and outputting a detection signal when the voltage of said power supply means is below a predetermined level;
second detecting means for detecting whether said power supply means is loaded to the camera;
memory means powered by said power supply means for storing various photographic information; and
control means powered by said power supply means for controlling a camera sequence and load means in the camera based on said photographic information, such that said control means discontinues the camera sequence and operation of said load means in response to the detection signal received from said first detecting means and, after said power supply means is unloaded from the camera, enables the camera sequence and the operation of said load means in response to a detection, which is carried out when said second detecting means detects that said power supply means is re-loaded to the camera, of said first detecting means that the voltage of said power supply means exceeds the predetermined level.

28. A camera as claimed in claim 27, wherein said power supply means includes a battery, and backup means connected to said battery and said load means, said load means being connected to said battery, and said backup means supplying power to said memory means while said control means maintains said camera sequence and said load means in an inoperative state.

29. A camera as claimed in claim 27, wherein said power supply means is a disposable battery removably mounted in a camera body.

30. A camera as claimed in claim 27, wherein said power supply means is a rechargeable battery removably mounted in or fixed to a camera body.

31. A camera as claimed in claim 27, wherein said second detecting means includes a switch operable with loading and unloading of said power supply means, said switch outputting the detection signal when said power supply means is loaded.

32. A camera as claimed in claim 28, wherein said backup means comprises a capacitor.

33. A camera as claimed in claim 28, wherein said backup means comprises a battery.

34. A camera as claimed in claim 27 or 28, wherein said load means includes a motor for winding a film.

35. A camera as claimed in claim 27 or 28, wherein said load means includes an electronic flash.

36. A camera as claimed in claim 27 or 28, wherein said load means includes drive means for driving a zoom lens.

37. A camera as claimed in claim 27 or 28, wherein a silver chloride film is used as a recording medium.

38. A camera as claimed in claim 27 or 28, which is an electronic still camera using a magnetic disk as a recording medium.

39. A camera as claimed in claim 27 or 28, which is a video camera using a magnetic tape as a recording medium.

* * * * *